Patented Nov. 27, 1951

2,576,101

UNITED STATES PATENT OFFICE 2,576,101

METHOD FOR TREATMENT OF VANADIUM AND URANIUM ORES

Blair Burwell, Grand Junction, Colo., assignor to Climax Uranium Company, a corporation of Delaware No Drawing. Application April 17, 1948,
Serial No. 21,750

3 Claims. (Cl. 23—14.5)

The invention relates to the treatment of ores or ore residues containing vanadium and uranium for the recovery of the vanadium and uranium contained therein.

In the treatment of ores containing vanadium and uranium, and particularly of the ores more specifically defined as carnotite or roscolite ores, for the recovery of their metal values, it has been the custom of the industry to crush the ores to a size of about minus fourteen mesh and to roast the ore in multiple hearth furnaces with the addition of from six to ten per cent salt at a temperature of about 830 degrees centigrade, whereupon a certain portion of the vanadium contained in the ore (usually about 75 per cent of the total) is converted into a water-soluble salt, i. e., sodium vanadate ($Na_2V_2O_7$). Upon addition of water to the roasted material, this water-soluble portion of the vanadium is separated from the residual solids by filtration, usually in a porous-bottomed tank; and the solution is then treated further by conventional methods to recover its vanadium content. The residues or tailings are then discharged from the filtration step to storage piles. In order to recover the uranium content, as well as additional vanadium which was not solubilized by the roasting with salt, the residues from this first operation are usually treated with dilute sulphuric acid, whereupon approximately 90 per cent of the uranium and 50 per cent of the remaining vanadium are taken in solution as the soluble uranyl and vanadyl sulphates, and are separated from the residue by filtration. After this separation, the acid liquor is treated to recover the metal values.

It is obvious that this process is involved and expensive. In the roasting step, a considerable loss occurs in the roaster gases in the form of dust and fumes. This loss varies from 3 per cent to 16 per cent of the metal content of the ore, depending upon the fineness of the ore. The ore is usually crushed to a coarse size to avoid dust losses, although finer sizes would result in a better reaction of the sodium contained in the salt with the vanadium of the ore. To effect recovery of the uranium and additional vanadium, it is necessary to purchase and transport large quantities of sulphuric acid to treatment plants and to rehandle the residues from the first salt roast filtration, as the leaching of this material cannot be carried out in the original filter tanks. The reaction of sulphuric acid on the ore residues which usually carry lime (CaO), forms insoluble calcium sulphate which interferes with the subsequent separation of the acid solution by cementing and sealing the material treated. Furthermore, the consumption of sulphuric acid, varying between 70 and 100 pounds per ton of ore, imposes a high cost on the operation.

A primary object of my invention is to overcome the above described and other defects in the prior processes for the treatment of uranium and vanadium ores through the provision of a process which reduces roasting losses, which utilizes previously wasted products to replace sulphuric acid, which provides for more efficient filtering, which is low in cost of operation and highly efficient in recovery and which is more nearly self-sustaining.

Other objects reside in various novel steps and treatments and/or combinations thereof, as will be apparent from the following description.

I have found that the waste gases resulting from the roasting of the ore may be treated to effect the recovery of a weak solution of hydrochloric acid and chlorine as well as to recover the values in the fumes and dust. This weak acid is used to leach the residues from the salt roast and water-leach operation, thus eliminating the need for sulphuric acid. The gases from the salt roasting operation contain substantial quantities of hydrochloric acid gas and chlorine, due to the reaction of salt on the vanadium mineral as well as on the silica and silicate minerals contained in the ore. I pass this gas, which is conventionally wasted, through an acid-proof scrubbing tower, through which cold water is circulated in contact with the furnace gases, thus absorbing the hydrochloric acid and a portion of the chlorine and removing mechanically the entrained dust and fumes which are separated in a suitable settling tank. The acid liquor is circulated in the scrubbing tower until the hydrochloric acid content is built up to a desired concentration, usually approximately 2.5 per cent HCl. The process is limited to the recovery of the acid in a relatively dilute form, preferably not to exceed 15 per cent HCl. About 30 pounds of HCl are thus recovered for each ton of ore treated by roasting with salt, the acid solution also containing small quantities of chlorine, silica, and alumina, as well as vanadium and uranium. For example, if the solution analyzes 2 per cent HCl, it will usually contain approximately .1 per cent $V_2O_5$ and .015 per cent $U_3O_8$.

A suitable quantity of this dilute acid solution, varying from 500 pounds to 1,500 pounds and containing from 10 to 35 pounds of HCl, is used to dissolve the uranium and acid-soluble vanadium from the residual material resulting from the salt roasting and water-leaching and filtration of a ton of the original ore. This acid solution can be added to the water-leached residue in the filtration tanks immediately following the first filtration without discharging the material from the filter tanks. The hydrochloric acid, which does not form an insoluble calcium salt, percolates freely through a great depth of material without cementation or sealing, and extracts approximately 90 per cent of the uranium and 50 per cent of the vanadium remaining in the residue from the water-leach cycle. After water washing the solids free of acid solution containing vanadium and uranium, the residues can be disposed of as final tailings.

The acid liquor is then treated with a suitable reducing agent such as metallic iron or ferrous sulphate to reduce the vanadium from the pentavalent state to the tetravalent state, and is then neutralized with a suitable alkali or base such as ammonia, sodium hydroxide, sodium carbonate or lime, to a pH value of between 4 and 6.5, whereupon the vanadium and uranium contained in the acid liquor is precipitated and separated as a hydrated oxide. The precipitate can be further treated for the separation of the uranium and vanadium by methods well known in the art.

The following detailed examples illustrate typical procedures used in carrying out the process of the invention:

One thousand grams of ore containing 1.85 per cent $V_2O_5$ and .12 per cent $U_3O_8$ were roasted for 2 hours with 8 per cent sodium chloride, and subsequently leached with water to remove the water-soluble vanadium. The residue from this filtration weighed 970 grams and contained .42 per cent $V_2O_5$ and .12 per cent $U_3O_8$. To this residue was added 500 grams of filtered aqueous acid solution containing 2.35 per cent HCl obtained by absorbing the gas generated by the roasting step in water. After the treatment, the residues, which weighed 960 grams, contained .20 per cent $V_2O_5$ and 0.012 per cent $U_3O_8$, or a calculated total recovery of 86.3 per cent of the vanadium and 90 per cent of the uranium. The acid liquor was reduced with metallic iron, and the vanadium and uranium precipitated by adding ammonia until the pH of the solution reached 4.5. The filtered precipitate assayed 27 per cent $V_2O_5$ and 14 per cent $U_3O_8$.

In a large-scale commercial test, 100 tons of ore containing 1.90 per cent $V_2O_5$ and 0.11 per cent $U_3O_8$ were roasted in a multiple hearth furnace for two hours, after which the roasted material was leached with water in a filter bottom tank 24 feet in diameter. The residue contained 0.43 per cent $V_2O_5$ and 0.110 per cent $U_3O_8$, or an extraction of 77.4 per cent of the $V_2O_5$ in the water-leach liquor. After draining off the water solution, 91,900 pounds of acid liquor, containing 2.24 per cent HCl, .10 per cent $V_2O_5$ and 0.010 per cent $U_3O_8$, were pumped into the tank and allowed to percolate through the ore bed, leaching the acid-soluble material. This acid solution was obtained by collecting the acid fumes in the roasting furnace gases in a scrubber unit at the time the 100 tons of ore were roasted. After the acid solution had passed through the material, the residue, amounting to 196,420 pounds dry weight, was discarded as waste. This material contained 0.21 per cent $V_2O_5$ and 0.019 per cent $U_3O_8$. The acid solution was passed through a device containing scrap iron to reduce the vanadium and uranium, following which soda ash ($Na_2CO_3$) was added to the reduced solution until a pH of 4.5 was obtained. The precipitated sludge contained 22.4 per cent $V_2O_5$ and 9 per cent $U_3O_8$.

By utilizing my process, a considerable reduction in the cost of operation may be obtained, since sulphuric acid need not be purchased, transported to the plant and there handled several times. The speed of filtration is increased, since HCl reacts with calcium compounds to form water soluble $CaCl_2$ rather than a cementitious precipitate of $CaSO_4$. Furthermore, the total recovery from the ore is increased, since the values ordinarily lost in the dust and fumes of the roasting operation are recovered with the acid liquor.

The precise limits of temperature employed in the roasting operation are not particularly critical and are understood by those skilled in the art. In practice, I prefer to roast under oxidizing conditions and must of course maintain a temperature at least sufficient to generate acid fumes.

My process, although particularly well adapted to the type of ore described, is applicable to similar processes which incorporate salt roasting and in which acid leaching could be advantageously employed. I do not therefore wish to limit myself to the specific details herein disclosed, except insofar as defined in the appended claims.

I claim:

1. The process for treating ground vanadium and uranium ores which includes roasting the ground ore with sodium chloride under oxidizing conditions, leaching the water soluble salts from the roasted ore, absorbing the acid gases and dust generated in the roasting operation in the water for forming an aqueous acid, dissolving the collected dust in the acid, leaching acid soluble materials from the water leached ore with the aqueous acid, reacting the acid solution with iron and subsequently neutralizing the acid solution to a pH value of 4–6.5.

2. The process for treating ground uranium-vanadium ores which includes the steps of roasting the ground ore with sodium chloride under oxidizing conditions at a temperature of at least about 700° C., leaching water soluble salts from the roasted ore, absorbing chlorine, dust and hydrochloric acid gas generated in the roasting step in the water to form an aqueous acid, dissolving the acid-soluble portion of the dust in the aqueous acid, leaching the water insoluble residue from the water leaching step with said aqueous acid to form an acidic solution, adding a reducing agent selected from a class consisting of iron and a ferrous salt of a mineral acid and neutralizing the acidic solution to a pH value of at least 4.5 whereby the vanadium and uranium values in the solution are precipitated.

3. The process for treating ground vanadium and uranium ore which includes roasting the chloride under oxidizing conditions, leaching the water-soluble salts from the roasted ore, absorbing the acid gases and dust generated in the roasting operation in water for forming an aqueous acid, dissolving the collected dust in the acid, leaching acid-soluble materials from the water-leached ore with the aqueous acid, reducing the dissolved vanadium present to the tetra-valent state and the dissolved uranium present to the quadri-valent state and then neutralizing the acid solution to a pH value of 4.0-6.5.

BLAIR BURWELL.

REFERENCES CITED

The following references are of record in the file of this patent:

UNITED STATES PATENTS

| Number | Name | Date |
| --- | --- | --- |
| 656,497 | De Bechi | Aug. 21, 1900 |
| 862,987 | McKnight | Aug. 13, 1907 |
| 890,584 | Fleck et al. | June 9, 1908 |
| 1,129,029 | Vogt | Feb. 16, 1915 |
| 1,223,567 | Davis | Apr. 24, 1917 |
| 1,563,732 | Egleson | Dec. 1, 1925 |
| 2,047,208 | Krchma | July 14, 1936 |